United States Patent [19]
Yang

[11] Patent Number: 5,941,764
[45] Date of Patent: Aug. 24, 1999

[54] SHAFT-EQUIPPED GRINDER USED IN A MOLD-GRAVING DEVICE

[76] Inventor: Maw-Chyuan Yang, No.133, Chuan-Tou Lane, Ying-Pu Tsun,Ta-Tu Hsiang, Taichung hsien, Taiwan

[21] Appl. No.: 08/879,223

[22] Filed: Jun. 19, 1997

[51] Int. Cl.[6] .................................................. B23B 51/00
[52] U.S. Cl. ........................ 451/358; 451/344; 279/75; 408/226
[58] Field of Search .................................... 451/344, 358, 451/360, 541, 363; 279/75; 408/226

[56] References Cited

U.S. PATENT DOCUMENTS

| | | | |
|---|---|---|---|
| 2,211,216 | 8/1940 | Oster | 451/358 |
| 4,525,111 | 6/1985 | Gutsche | 408/226 |
| 4,527,449 | 7/1985 | Sydlowski et al. | 408/226 |
| 4,818,157 | 4/1989 | Kouvelis | 408/240 |
| 4,850,758 | 7/1989 | Morgan | 408/226 |
| 5,152,642 | 10/1992 | Pitts et al. | 408/226 |
| 5,271,697 | 12/1993 | Johnson et al. | 279/75 |

*Primary Examiner*—Eileen P. Morgan
*Attorney, Agent, or Firm*—Rosenberg, Klein & Bilker

[57] ABSTRACT

A shaft-equipped grinder used in a mold-graving device, including a grinding member with a circular periphery and a shaft fixed on the grinding member. The shaft has a driving section with none circular cross-section, a locating section with circular cross-section and a stopper section formed as an annular groove. The grinder can be easily and quickly assembled with or disassembled from the mold-graving device. Also, the grinder can be accurately located on the mold-graving device coaxially with the rotary shaft thereof.

3 Claims, 4 Drawing Sheets

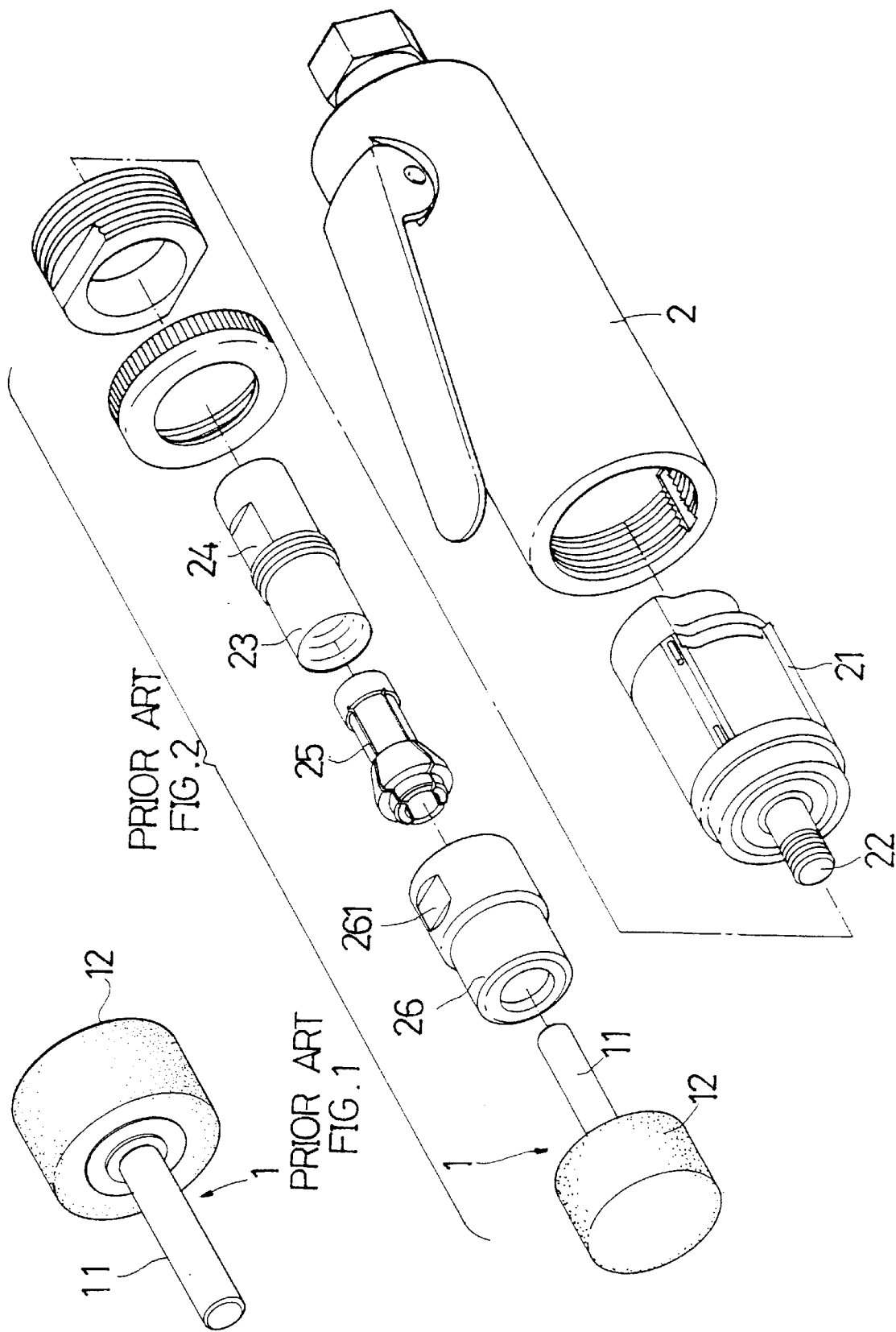
PRIOR ART FIG. 1
PRIOR ART FIG. 2

SHAFT-EQUIPPED GRINDER USED IN A MOLD-GRAVING DEVICE

BACKGROUND OF THE INVENTION

The present invention relates to a shaft-equipped grinder used in a mold-graving device, in which the shaft of the grinder can be easily and quickly located on the mold-graving device and driven thereby at high rotational speed.

A shaft-equipped grinder is used in a mold-graving device for polishing and grinding the mold. Conventional shaft-equipped grinders include grinding wheel, grinding paper ring, grinding paper disc and iron brush wheel. Depending on the grinding effect and subject to abrasion, the shaft-equipped grinder must be frequently replaced. Therefore, it is necessary to frequently disassemble and assemble the shaft-equipped grinder on the mold-graving device.

FIG. 1 shows a conventional shaft-equipped grinding wheel 1 which includes a grinding member 12 with a circular periphery and a shaft 11 axially extending from the center of the grinding member 12. In order to avoid loosening and radial displacement of the shaft, which will result in that the grinding member 12 hits the work piece and breaks, it is necessary to accurately locate the shaft 11 on the mold-graving device coaxially with the rotary shaft of the motor.

FIG. 2 shows the fixing device for the mold-graving device, in which a pneumatic motor 21 is axially disposed in the main body 2 of the mold-graving device. The rotary shaft 22 of the motor is screwed with a sleeve tube 23 having two opposite plane faces 24. A claw-like cylinder clamp 25 is disposed in the sleeve 23 and an outer sleeve 26 is screwed around the sleeve tube 23 to fasten the cylinder clamp 25 for clamping the shaft 11 of the grinding wheel 1. In addition, the outer periphery of the outer sleeve 26 is formed with two opposite plane faces 261 for a tool to tighten the outer sleeve 26 so as to avoid axial detachment or radial rotation of the shaft 11.

According to the above arrangement, the fixing device can accurately fix the grinding member on the mold-graving device coaxially with the rotary shaft of the motor. However, when disassembling or assembling the grinding member, as shown in FIG. 3, an operator must use two wrenches 27 at the plane faces 24, 261 of the sleeve tube 23 and the outer sleeve 26 to reversely twist the same so as to tighten or untighten the cylinder clamp 25. Apparently, it is quite inconvenient to disassemble or assemble the grinding member. Moreover, due to negligence, the shaft 11 of the grinding member may be not accurately tightened. This will lead to slippage or even flying out of the grinding member during working.

In addition, in order to cooperate with the shaft-equipped grinder, the following parts of the mold-graving device in addition to the rotary shaft 22 are required to be concentrically processed at high precision: the portion of the sleeve tube 23 screwing with the rotary shaft 22, the inner edge of the sleeve tube 23 for fitting with the cylinder clamp 25, the outer edge of the cylinder clamp 25 for fitting with the sleeve tube 23, the inner edge of the cylinder clamp 25 for contacting with the shaft 11 of the grinding member and the portion of the outer sleeve 26 for fastening the cylinder clamp 25. Obviously, it is difficult to process these parts and the manufacturing cost is very high.

FIG. 4 shows an electric screwdriver head 3 which is used in a pneumatic screwdriver or wrench for quickly assembling or disassembling from the tool. However, such tool works at lower rotational speed so that the concentricity of the screwdriver head 3 and the power outputting rotary shaft of the tool is not required to have high precision. Therefore, such structure cannot be applied to the shaft-equipped grinding member.

SUMMARY OF THE INVENTION

In order to solve the above problems, it is a primary object of the present invention to provide a shaft-equipped grinder which can be easily and quickly assembled with or disassembled from the mold-graving device without using any tool. After assembled, the grinder is accurately located on the mold-graving device coaxially with the rotary shaft thereof.

The present invention can be best understood through the following description and accompanying drawings, wherein:

BRIEF DESCRIPTION OF THE DRAWINGS

FIG. 1 is a perspective view of a conventional shaft-equipped grinder;

FIG. 2 is a perspective exploded view of the fixing device for fixing the grinder of FIG. 1 in the mold-graving device;

DETAILED DESCRIPTION OF THE PREFERRED EMBODIMENTS

Figure 3:
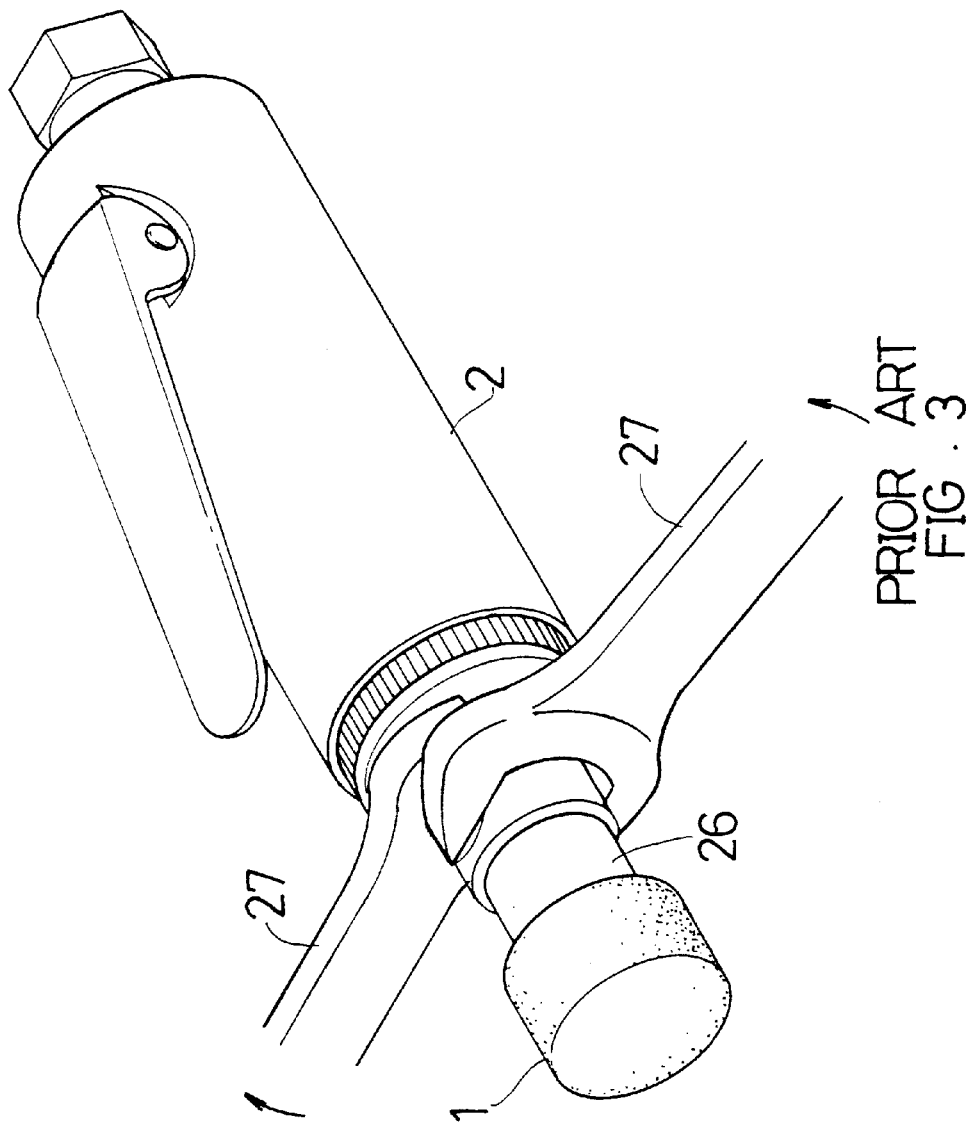
FIG. 3 shows that the grinder of FIG. 1 is disassembled from the mold-graving device by two wrenches.
Figure 4:
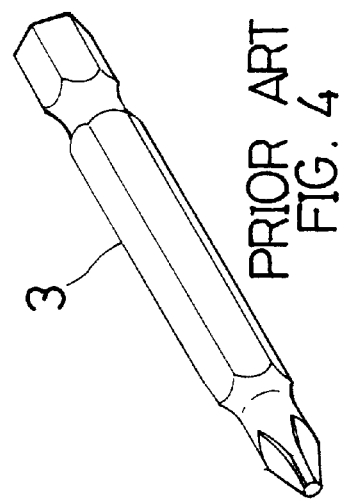
FIG. 4 shows a screwdriver head used in a pneumatic screwdriver.
Figure 5:
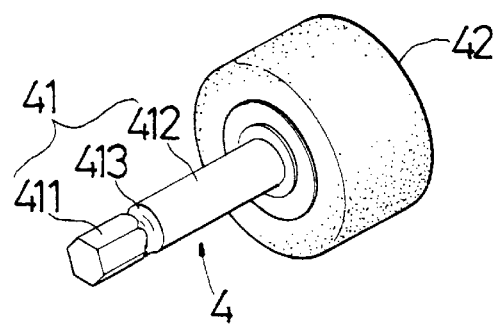
FIG. 5 is a perspective view of a first embodiment of the present invention.

Please refer to FIG. 5. According to a first embodiment, the shaft-equipped grinder of the present invention is a grinding wheel having a grinding member 42 with circular periphery and a shaft 41 at the center. One end of the shaft 41 is fixed on the grinding member 42, while the other end of the shaft axially extends by a certain length as a rod member. The shaft 41 integrally includes an outermost shorter driving section 411 with hexagonal cross-section, a middle longer locating section 412 with circular cross-section and an inner stopper section 413 as an annular groove.

Figure 6:
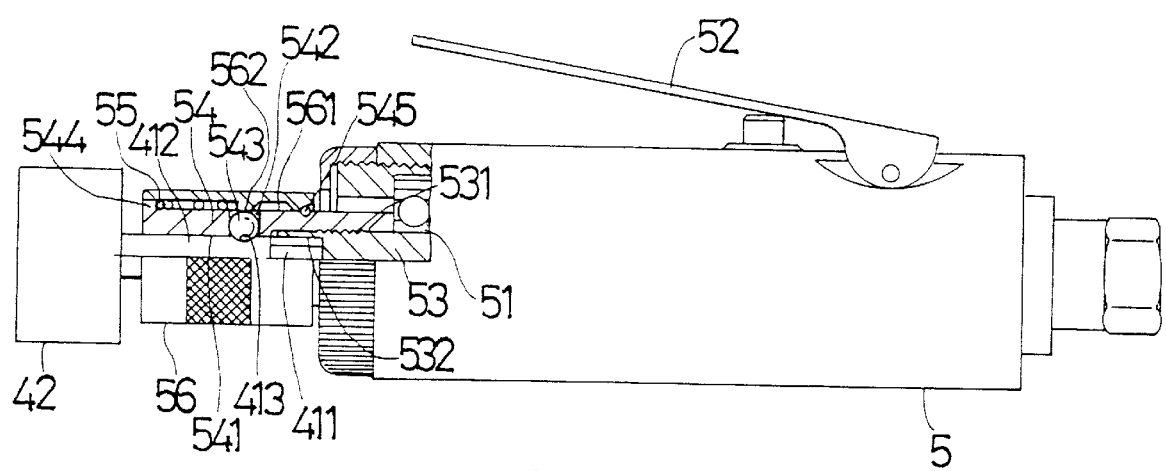
FIG. 6 is a sectional view of the embodiment of FIG. 5, in which the grinder is fixed in the mold-graving device.

Referring to FIG. 6, a pneumatic motor 51 is axially disposed in the main body 5 of the mold-graving device. The rotary shaft 53 of the motor 51 axially extends out of the front end of the main body 5. The rotary shaft 53 is formed with an outer thread section 531 and a driving section 532 axially rearward extending from the front end of the rotary shaft. The driving section 532 is a socket with hexagonal cross-section.

A sleeve tube 54 is screwed around the thread section 531 of the rotary shaft 53. After the sleeve tube 54 is associated with the rotary shaft 53, the hollow portion thereof forms a locating section 541. The locating section 541 is a socket extending forward from the front end of the rotary shaft 53 along the inner wall of the sleeve tube 54. The cross-section of the locating section 541 is circular and the locating section 541 has a length longer than that of the driving section 532.

The locating section 541 is formed with a ball hole 542 passing through the wall thereof. A steel ball 543 is placed in the ball hole 542. The diameter of the inner end of the ball hole 542 is smaller than that of the steel ball 543, whereby the steel ball 543 can protrude out of the inner wall of the sleeve tube 54 without dropping out. The front end of the sleeve tube 54 is formed with a flange 544. The sleeve tube 54 is disposed with a stopper ring 545 between the ball hole 542 and rear end. The stopper ring 545 is disposed after a spring 55 and an outer tube 56 are fitted around the sleeve tube 54.

One end of the spring 55 abuts against the flange 544 of the sleeve tube, while the other end thereof abuts against the outer tube 56. The inner wall of the outer tube 56 is formed with an annular groove 561 for the steel ball 543 to extend therein. Due to the pushing force of the spring 55, a pressing section 562 of the outer tube 56 pushes the steel ball 543 to inward protrude.

According to the above arrangement, when it is desired to install the grinder 4 with the shaft onto the mold-graving device, the outer tube 56 is first forward pushed with one hand to align the annular groove 561 with the steel ball 543, whereby the steel ball 543 has a space for outward moving. At this time, the grinder 4 is held by the other hand to axially insert the shaft 41 from the front end of the sleeve tube 54 with the driving section 411 of the shaft 41 entering the driving section 532 of the rotary shaft 53 and with the stopper section 413 aligned with the steel ball 543. Then the outer tube 56 is released, whereby the outer tube 56 is pushed rearward by the spring 55 and the pressing section 562 thereof pushes the steel ball 543 to inward insert into the stopper section 413 of the shaft 41. At this time, the assembling operation is completed. Because the driving section 532 of the mold-graving device also has a hexagonal cross-section, the hexagonal driving section 411 of the grinder 4 can be driven thereby without slippage. Moreover, the driving section 532 is only for drivingly rotating the driving section 411 so that it is unnecessary to have a high cooperation precision.

The locating section 412 of the present invention has a circular cross-section so that it is easy to achieve the necessary processing accuracy. Therefore, the locating section 412 can precisely cooperate with the circular locating section 541 of the mold-graving device by very small tolerance so as to support the shaft-equipped grinder 4 without swinging or eccentricity. Accordingly, a more accurate locating effect can be achieved and the assembling procedure can be quickly accomplished.

The steel ball 543 can be inserted into the stopper section 413 of the grinder 4 so that the axial displacement of the grinder 4 is avoided. In addition, the steel ball 543 abuts against the stopper section 413 to reduce the vibration between the shaft 41 of the grinder 4 and the locating section 541 of the mold-graving device. According to the above arrangement, the present invention can be precisely located and quickly replaced without using any tool such as wrenches.

Figure 7:
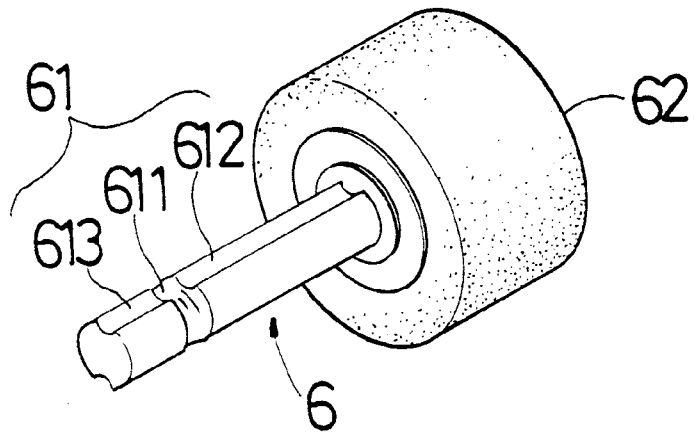
FIG. 7 is a perspective view of a second embodiment of the present invention.

FIG. 7 shows a second embodiment of the present invention, in which the grinder 6 includes a shaft 61 and a grinding member 62. The driving section 613 of the shaft 61 has two semicircular channels formed on two opposite sides thereof and on two opposite sides of the locating section 612. The driving section 613 axially extends from the outer end of the shaft to the grinding member 62. In this embodiment, the stopper section 611 is also an annular groove. The mold-graving device cooperating with this embodiment can have a fixing section formed with a profile complementary to that of the shaft 61.

Figure 8:
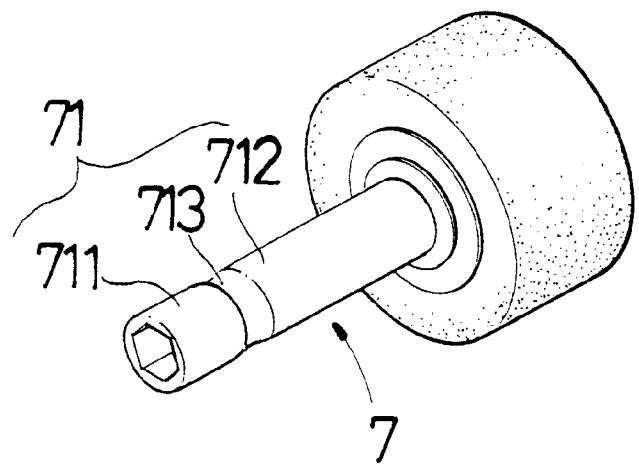
FIG. 8 is a perspective view of a third embodiment of the present invention.

FIG. 8 shows a third embodiment of the present invention, which is different from the first embodiment in that the driving section 711 of the shaft 71 of the grinder 7 is a hexagonal socket axially extending from the outer end of-the shaft 71. The locating section 712 and the stopper section 713 of the shaft 71 are identical to those of the first embodiment.

It is to be understood that the above description and drawings are only used for illustrating some embodiments of the present invention, not intended to limit the scope thereof. Any variation and derivation from the above description and drawings should be included in the scope of the present invention.

What is claimed is:

1. A shaft-equipped grinder used in a mold-graving device, comprising:
   a pneumatically driven motor;
   a rotary shaft coupled to said motor for rotation therewith, said rotary shaft having a driving region formed on a distal end portion thereof, said driving region having a non-circular cross-sectional contour;
   an axially extended sleeve tube having a first end coupled to said rotary shaft for rotation therewith and a through bore extending between said first end and a second end thereof, said through bore having a substantially circular cross-sectional contour, said sleeve tube having a transversely directed ball hole formed therein in open communication with said through bore;
   a spring biased steel ball disposed in said ball hole;
   a grinding member with a circular periphery; and
   a shaft, a first end of said shaft being fixed to a center of said grinding member and a second end axially spaced a predetermined distance from said first end of said shaft, said shaft being received in said through bore of said sleeve tube for coupling to driving region of said rotary shaft, said shaft including:
      a driving section formed adjacent said second end of said shaft and having a non-circular cross-sectional contour corresponding to said cross-sectional contour of said rotary shaft driving region for rotative coupling therewith, said driving section having a predetermined length dimension;
      a locating section formed adjacent said first section of said shaft and having a circular cross-sectional contour, said locating section having a length dimension greater than said predetermined length dimension of said driving section, said locating section having a portion thereof disposed in said through bore of said sleeve tube for precisely rotatively supporting said shaft to substantially prevent swinging and eccentricity of said grinding member; and
      a stopper section defined by an annular groove formed in said shaft between said driving section thereof and said locating section, said annular groove being in disposed in aligned relationship with said ball hole for receiving a portion of said spring biased steel ball therein.

2. A shaft-equipped grinder as claimed in claim 1, wherein the driving section of the shaft has a hexagonal cross-section.

3. A shaft-equipped grinder as claimed in claim 1, wherein the driving section of the shaft is defined by a socket having an internal hexagonal cross-sectional contour formed in said second end of the shaft.

* * * * *